June 15, 1943.                L. C. McNUTT                2,322,203
                          SCANNING APPARATUS
                          Filed June 6, 1940                 2 Sheets-Sheet 2
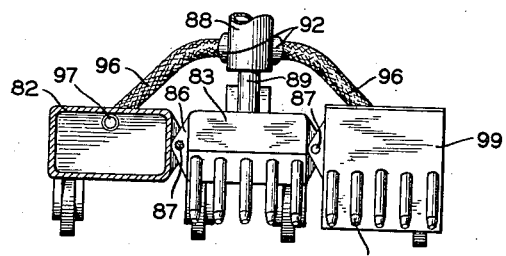
FIG. 5
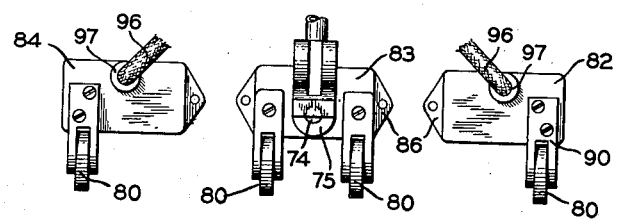
FIG. 6
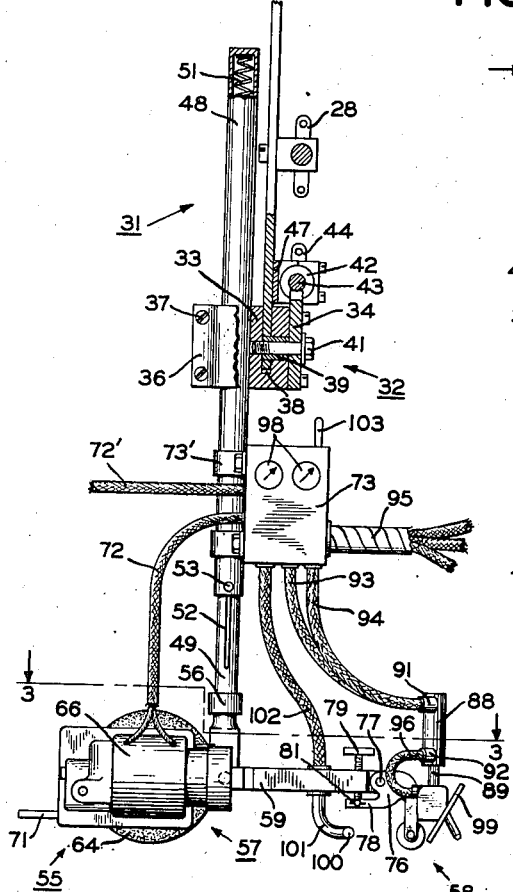
FIG. 4
FIG. 3
FIG. 2
INVENTOR
LOUIS C. McNUTT
BY Virgil F. Davis
ATTORNEY Patented June 15, 1943

2,322,203

UNITED STATES PATENT OFFICE 2,322,203

SCANNING APPARATUS

Louis C. McNutt, Scotch Plains, N. J., assignor to M. W. Kellogg Company, New York, N. Y., a corporation of Delaware Application June 6, 1940, Serial No. 339,049

6 Claims. (Cl. 266—23)

This invention relates, in general, to apparatus for determining the presence and position of sub-surface defects in metal bodies.

In my co-pending application, Serial No. 209,153, now U. S. Patent No. 2,260,186 issued October 21, 1941, filed May 20, 1938, and entitled "Method for examining metal for sub-surface defects," and my patent, No. 2,206,969, granted July 9, 1940, and entitled "Scanning apparatus" I have described and illustrated a method for testing bodies to determine the existence of sub-surface defects, such as laminations, slag deposits, gas pockets, etc., and suitable apparatus for carrying out the method in practice. The apparatus, or scanning machine, disclosed therein, although designed to operate successfully on irregular surfaces, is most suitably adapted for operation on substantially flat surfaces which may or may not have slight surface irregularities.

The present invention contemplates, more particularly, the construction of apparatus for testing curved surfaces, such as the spherical or ellipsoidal heads of pressure vessels, tanks, etc., for the purpose of detecting sub-surface defects. It is especially applicable for the testing of composite metal, such as that used in the fabrication of corrosion-resistant vessels. The composite metal referred to includes a metal base, such as steel, to which is united a comparatively thin metal lining. The lining is usually for the purpose of forming a protective coating for the base metal, and commonly comprises a corrosion resistant alloy.

A primary object of this invention is to provide apparatus for progressively scanning a circular area of a surface to determine the presence of sub-surface imperfections.

A further object is to provide apparatus for progressively scanning the surface of curved bodies to determine the presence of sub-surface imperfections.

Another object is to provide apparatus for progressively scanning the inner surface of a concave body, such as the spherical or ellipsoidal heads of pressure vessels.

These and other objects are effected by this invention as will be apparent from the following description and claims taken in connection with the accompanying drawings forming a part of this application, in which:

Fig. 2 is an enlarged side view of the heater unit with its control and supporting devices partly in section.

Fig. 3 is a plan view of the heater unit or truck taken along line 3—3 of Fig. 2.

Fig. 4 is a fragmentary front view of the hand control devices, showing also the cutting planes for the sectioned portion of Fig. 2.

Fig. 5 is an elevation of the torch members, portions being removed or sectioned for the sake of clarity; and Fig. 6 is an exploded rear view of the torch members.

Figure 1:
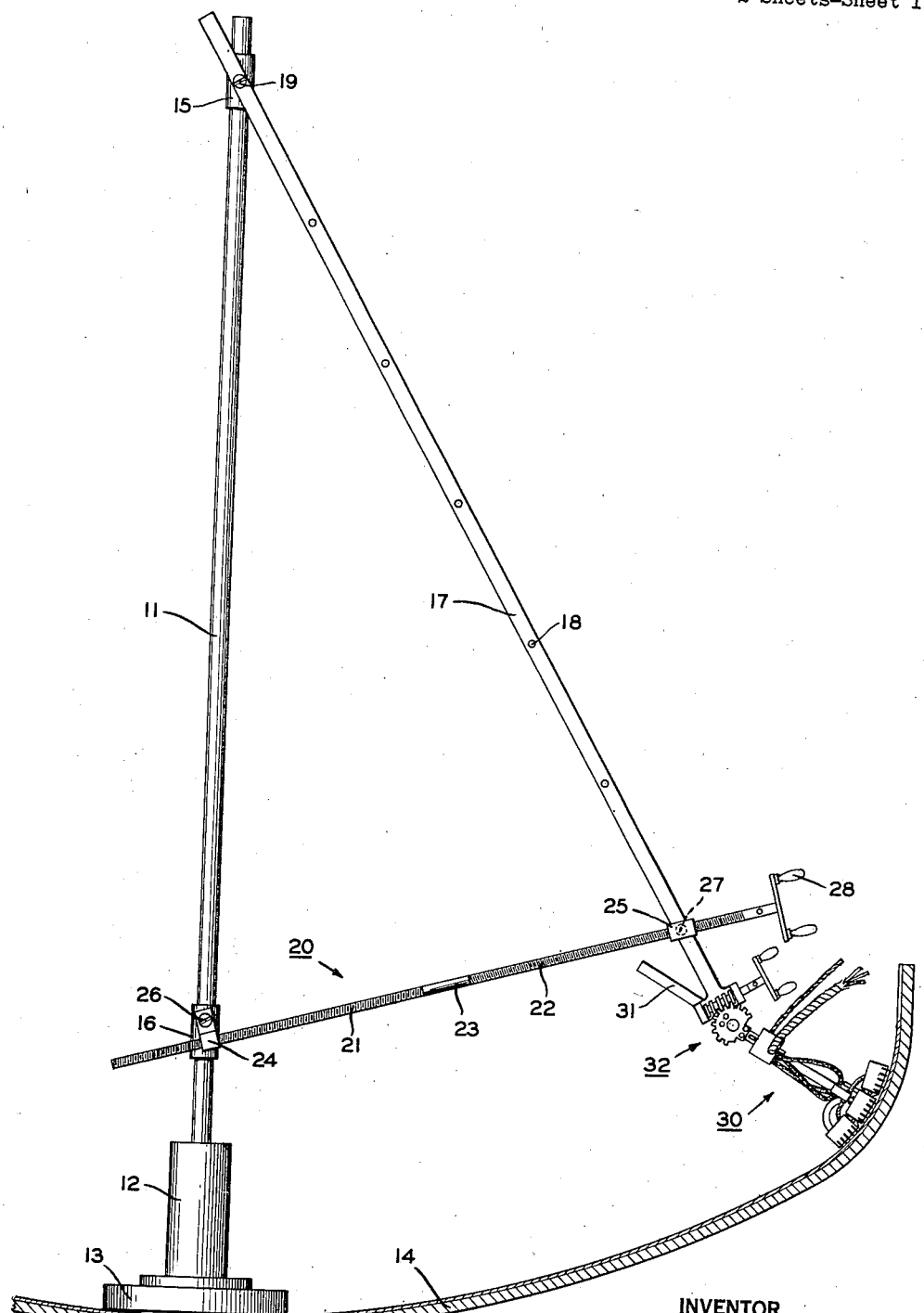
Fig. 1 is a view of the scanning machine in operating position on an ellipsoidal workpiece.

In its preferred embodiment, the invention comprises a heater adapted to travel in a circular path, which path may be determined with regard to radius and elevation.

The apparatus, as illustrated, includes a freely rotatable standard, such as shaft 11, having its lower end set in a vertical bearing 12 mounted on a base 13. The support is placed at the center of the upturned workpiece 14, which I have chosen to show in the form of an ellipsoidal head. The workpiece 14 is made of composite metal, that is metal having a base, such as steel, to which has been united a lining of different metal, such as corrosion resistant alloy.

Two vertically adjustable sleeves 15 and 16 are fixed on shaft 11, the former near the top of the shaft, and the latter a short distance above the bearing 12.

A bar 17, having a plurality of equi-spaced pivot holes 18, is pivotally attached to the upper sleeve 15 by a removable pin 19. The effective length of the bar 17 may be shortened by connecting the bar to the sleeve through any of the other pivot holes.

A long feed-screw 20, having oppositely threaded sections 21 and 22 separated by a short unthreaded portion 23, is supported for rotation in correspondingly threaded support members 24 and 25. Support member 24, carrying threaded section 21, is pivotally attached at 26 to the sleeve 16 on shaft 11; and support member 25, carrying threaded section 22, is pivotally attached at 27 adjacent the lower or free end of bar 17. Feed-screw 20 is extended beyond the end of threaded section 22 to form a support for a hand-crank 28.

Shaft 11, bar 17, and feed-screw 20 thus form a rigid frame rotatable about the axis of shaft 11.

Hand-crank 28 is operated to vary the angle between shaft 11 and bar 17 so that the radius of the arc through which the lower end of bar 17 travels in its rotation about shaft 11 may be controlled. The crank may, of course, be placed instead at the opposite or inner end of screw 20, or a crank may be provided at each end.

The lower or free end of bar 17 supports a heater unit, generally indicated at 30, through a pivoted support arm 31. The heater is thus normally movable in a circular path about the axis of shaft 11. A control mechanism 32, through which support arm 31 is angularly adjustable relative to the end of bar 17, causes the heater unit to be movable in a controlled manner laterally of its normal path of travel, that is, substantially radially with respect to the axis of shaft 11.

While the arrangement just described readily enables the heater unit 30 to be moved over the entire concavity of the workpiece illustrated, it is obvious that the outer or convex surface also may be traversed. To obtain such a result the workpiece is turned over and the standard 11 is positioned on the crown of the workpiece coincidently with the vertical axis. As the heater unit is fed outwardly the setting of bar 17 is changed to make it longer.

Control mechanism 32 comprises a block 33 having a gear sector 34 rigidly secured, as by screws 35, to its front vertical face. The rear of block 33 is shaped to form a split sleeve 36 which encases support arm 31. Clamping screws 37 hold the support arm rigidly in place. Forward of the split sleeve 36 is a slot 38 extending transversely across the top of the block 33 parallel to the plane of gear sector 34. The lower end of bar 17 is received within the slot 38, the bar and the block being pivotally attached by means of a hollow pivot pin 39. Pin 39 is inserted horizontally in an opening extending through gear sector 34, the forward side of the slot, and the bar, and is held in place by a cap screw 41 passing through the hollow center and set in the rear side of the slot.

Gear sector 34 is engaged by a worm 42 mounted on a shaft 43 having at its end a hand-crank 44. Shaft 43 is supported in bearing blocks 45 and 46 which are rigidly secured to the opposite ends of a cross-member 47 attached to bar 17. By rotating hand-crank 44, the support arm 31 is made to revolve in a vertical plane, thus carrying the heater unit 30 along an arc therein about the pivot pin 39.

Heater support arm 31 comprises a telescopic arrangement of tubes 48 and 49. The outer tube 48 is gripped securely by the split-sleeve 36 of block 33. Tube 48 is closed at its upper end and contains a helical spring 51 which is placed under compression between the closed end and the inner end of tube 49. A longitudinal slot 52 in the side of tube 49 and a removable pin 53 set in the side wall of tube 48 adjacent its open end cooperate to limit relative longitudinal movement of the tubes and to prevent relative rotational movement about their common axis.

A heater unit, generally indicated at 55, is attached by a coupling device 56 to the outer end of tube 49.

Heater unit 55 is a self-propelled truck or carriage having a driving mechanism 57 and a torch 58 supported on opposite ends of a metal frame 59, as shown in Fig. 3.

Frame 59 is a single, extended metal member, preferably forged or cast, having a vertical, longitudinal slot or opening 61 approximately midway between the ends. A short connecter 62 has its lower end inserted in the slot 61 and pivotally attached to the frame by a transverse pin 63 set in the sides of the slot. The opposite end of connecter 62 is joined to the end of tube 49 by the coupling 56.

The heater unit or truck 55 is driven from the rear by a traction-wheel 64 mounted to one side of the frame 59 on the end of a horizontal shaft 65 extending transversely therethrough. The periphery of wheel 64 is provided with a non-skid surface material to minimize slippage of the wheel on the surface of the metal body being tested.

Traction wheel 64 is driven by a variable speed motor 66 controlled by the rotatable head 67. A flexible coupling 68 connects the motor shaft to a gear transmission unit 69 which further reduces the speed of the driving shaft. Transmission unit 69 includes a clutch for disconnecting the motor from the traction wheel 64. The clutch is operated by a lever 71.

The variable speed motor and the transmission may be of any well-known type capable of producing a range of low speeds for the truck. Since they, per se, form no part of this invention, it is deemed unnecessary to describe them in detail.

Motor 66 is supplied with current through cable 72 from a control box 73 mounted on the lower end of tube 48 by brackets 73'. A cable 72' connected to the control box 73 supplies electric current to the apparatus.

The torch 58 is pivotally attached at 74 to the forward arm 75 of bell-crank member 76 which in turn is pivotally attached at 77 to the forward end of frame 59. Pivot 77 passes horizontally through the members of a tongue-and-groove connection. The other arm 78 of bell-crank member 76 extends backward under the front end of the frame 59.

A hand-screw 79 is set vertically in the forward end of the frame with its lower end projecting from the under side. The lower end of the hand-screw is connected by a loose coupling 81 to the arm 78 of the bell-crank member, so that by manipulating the hand-screw, the angular position of forward arm 75 may be determined.

Torch 58 comprises three gas distributing chambers 82, 83, and 84 arranged in a row at a right angle to the longitudinal axis of the frame 59. Each chamber has a row of gas jets 85 projecting forwardly and downwardly from the forward side thereof. The middle chamber 83 is the one that is pivotally connected at 74 to bell-crank arm 75. The adjoining ends of chambers 82, 83, and 84 are loosely connected by vertical tongue and groove members 86 extending laterally with respect to the longitudinal axis of the truck frame and united by pivot pins 87. The jets 85 are so arranged that, when the truck is resting on a flat surface, all will line up in a straight substantially equi-spaced row.

Chambers 82, 83, and 84 are supported on rollers 89 mounted in brackets 90 attached to the rear of the chambers. The end chambers 82 and 84 have one roller apiece mounted adjacent the outer end; and middle chamber 83 has two rollers, one on each side of the bell-crank member 76.

A gas mixing chamber 88 is connected by a short length of tubing 89 to the central chamber 83 through its top wall. Mixing chamber 88 has a double inlet 91 at the top and a double outlet 92 at the bottom. Although not limited thereto, I have preferred to employ an oxy-acetylene flame for the torch. Flexible tubes 93 and 94 therefore conduct oxygen and acetylene from control box 73 to the mixing chamber through inlets 91. The oxygen and acetylene are supplied from an external source, not shown, to control box 73 through conduit 95. The oxy-acetylene mixture is supplied to chamber 83 through tubing 89 and to chambers 82 and 84 through flexible tubes 96 which connect outlets 92 of mixing chamber 88 to inlets 97 located in the rear walls of the chambers. Control valves for regulating the flow of oxygen and acetylene to the gas mixing chamber are included within the control box 73. Pressure gauges 98 may be used to aid in maintaining a controlled flow.

Baffle plates 99, having holes or slots through which the jets 85 may project, are attached to the chamfered front face of each torch chamber. A broad stream of air is directed forwardly from a point behind the baffle plates by means of an air nozzle in the form of a perforated tube 100 disposed beneath and transversely of the frame 59. Tube 100 extends the entire width of the torch and has its perforations in a line along the forward side. The tube 100 has an air inlet pipe 101 connected thereto at its midpoint. The inlet pipe 101 is rigidly supported from a fitting in the frame 59. Air is supplied to the fitting from an external source, not shown, through conduit 95, control box 73, and flexible tubing 102. The baffles 99 serve not only to deflect heat which is reflected from the surface of the workpiece, but also to deflect upwardly with their rear surface the stream of air coming from nozzle 100. The air, in passing over and around the torch chambers and the bases of the jets, cools the torch apparatus sufficiently to prevent its overheating or burning.

The control box 73 receives the electric current supply, through cable 72′, and the oxygen, acetylene, and air supplies, through cable 95. From the control box the current, oxygen, acetylene, and air are distributed in controlled amounts to the heater truck. It is not deemed necessary to show the various arrangements, such as valves, etc., which are required for this metering. It is to be understood, however, that the various supplies are controlled from a single lever 103. When lever 103 is thrown, the motor is started, the gas supply is turned on, and air is blown from perforated pipe 100. The torch may then be lighted. When stopping the machine, the current supply, the gas and the air supply are all turned off simultaneously by throwing back lever 103.

To operate the testing mechanism above-described, the workpiece 14 is placed on the floor or ground concave side up, and the base 13 of the standard 11 is placed as near to the center of the workpiece as possible, so that the standard will approximately coincide with the vertical axis of the ellipsoidal surface. Sleeve 15 is adjusted on shaft 11 so that pivot pin 19 will be as near to the center of curvature of the central portion of the workpiece as possible, and bar 17 is attached through one of holes 18 to the pin 19. Preferably, the bar 17 is suspended so that the pivot 39 at its lower end will be spaced from the workpiece a distance approximately equal to the short radius of curvature at the outer portion of the ellipsoidal head. Where workpieces of standard sizes are being treated, setting of the apparatus may be greatly facilitated by making suitable markings on shaft 11 and providing specially spaced and marked pivot holes on bar 17 to correspond therewith.

In the starting position, the bar 17 is positioned close to the standard, heater support arm 31 is positioned parallel to bar 17, and support arm tube 48 is set in sleeve 36 so that spring 51 will apply a predetermined pressure to the heater truck, forcing it against the workpiece. I have found that a 50 lb. spring, set to initially apply a 25 lb. force, works very satisfactorily.

Control lever 103 is thrown to start the truck, and the jets are lighted. The truck will then travel in a circle about the base 13. After one revolution, feed-screw 20 is operated through hand-crank 28 to move bar 17 outwardly, causing the heater truck to travel in a wider concentric circle. This operation is repeated until the entire central portion of the head is traversed out to the zone where the curvature changes abruptly. From this zone outward, hand-crank 44 is operated, since pivot 39 is now approximately at the center of curvature of the outer portion of the head. Still traveling in circles about the standard, the heater support arm may easily be rotated in a short arc by operation of hand-crank 44 so as to travel up the steep sides of the dished head.

If heat is to be applied evenly to the workpiece, the scanning rate, or the speed of the heater truck relative to the surface of the workpiece, must be uniform. As stated, motor 66 is selected to provide uniform and controlled drive-wheel speed. It is important therefore to guard against slippage of the wheel 64 on the surface of the workpiece. The treated surface of the wheel aids to some extent, but it is also essential to maintain sufficient pressure of the wheel against the surface at all times. When the workpiece is cup-shaped, as shown, it will be noted that the force component of the truck's mass acting normal to the surface of the workpiece varies in diminishing degree as the truck moves outwardly toward the rim. In other words, with increasing slope of the surface there is decreasing traction, so that were it not for the force exerted by spring 51 slippage might occur. While the pressure of the spring may vary as the truck scans the irregular surface it is only necessary that its minimum value be well within the safe range.

It is obvious that, in a proper case, the apparatus may initially be set and the hand-cranks may subsequently be skillfully controlled so that in traveling outwardly the support arm 31 will gradually telescope against the action of its spring 51. In this way a substantially uniform pressure of the drive-wheel against the workpiece may be maintained throughout the operation. That is, while the truck is at the center of the workpiece and substantially its entire mass is acting normal to the surface, the spring pressure may be a minimum; and as the truck approaches the outer rim, where the force component of its mass acting normal to the surface is considerably less, the spring pressure may accordingly be increased. In any case, standard 11 is given sufficient stability, through base 13, to withstand the forces exerted against it.

From the foregoing description, it will be observed that I have provided improved apparatus for scanning and testing irregular or curved surfaces in accordance with the method outlined in the afore-mentioned U. S. Patent No. 2,260,186, granted October 21, 1941.

By my novel apparatus I am enabled to progressively move a heater element at a fixed predetermined speed over the inner surface of a cup-shaped metal body.

Furthermore, I have provided a novel torch element which, while covering a broad band of the surface, is readily conformable to changes in curvature therein, so that at all times the heater elements of the torch will be substantially equi-spaced from the band or zone of the workpiece being treated.

While this invention has been shown in but one form, it will be obvious to those skilled in the art that it is not so limited but is susceptible to various changes and modifications without departing from the spirit thereof, and it is desired therefore that only such limitations shall be placed thereon as are specifically set forth in the appended claims.

I claim:

1. A scanning apparatus for progressively moving a testing device over a substantially circular surface area comprising a base intended to be positioned at the center of said area, a rotatable vertical shaft having its lower end journalled in said base, a bar pivotally suspended to rotate on a horizontal axis from the upper end of said shaft, means for rotating said bar on its pivot to vary the angle between the bar and the shaft, an extensible support arm having limited extension pivotally mounted to rotate on a horizontal axis at the lower end of said bar, means constantly urging said support arm to its extended position, means for rotating said support arm on its pivot, and a testing device attached to the end of said support arm, said device being movable about said shaft in a path determined by both of said rotating means.

2. A scanning apparatus for traversing a substantially circular area of a surface to progressively heat each portion thereof comprising a base, a rotatable vertical shaft having its lower end journalled in said base, a bar pivotally suspended to rotate on a horizontal axis from the upper end of said shaft, means for rotating said bar on its pivot to vary the angle between the bar and the shaft, a support arm pivotally mounted to rotate on a horizontal axis at the lower end of said bar, means for rotating said support arm on its pivot, a heater attached to the end of said support arm, and means for driving said heater about said shaft, said heater being movable along a path determined by both of said rotating means.

3. A scanning apparatus for heat-testing the concave surface of an up-turned, cup-shaped body by progressively and uniformly applying to each portion thereof a predetermined amount of heat comprising a base, a rotatable vertical shaft journalled at its lower end in said base, a bar pivotally suspended to rotate on a horizontal axis from the upper end of said shaft, means for rotating said bar on its pivot to vary the angle between the bar and the shaft, a support arm pivotally mounted to rotate on a horizontal axis at the lower end of said bar, means for rotating said support arm on its pivot, and a heater unit attached to the end of said support arm including a gas chamber having a row of gas jets substantially parallel to the plane formed by said shaft and said bar, means attached to said chamber for limiting movement of said jets toward said surface beyond a predetermined minimum distance, and means for driving said heater unit at uniform speed along a path on said surface determined by both of said rotating means.

4. A scanning apparatus for heat-testing the concave surface of an upturned, cup-shaped body by progressively and uniformly applying to each portion thereof a predetermined amount of heat comprising a base, a rotatable vertical shaft having its lower end journalled in said base, a bar pivotally suspended to rotate on a horizontal axis from the upper end of said shaft, a feed-screw cooperatively engaging said bar and said shaft, a feed-screw cooperatively engaging said bar and said shaft for varying the angle therebetween, a support arm pivotally mounted to rotate on a horizontal axis at the lower end of said bar, a worm-and-gear device supported at the end of said bar for rotating said support arm on its pivot, and a heater unit attached to the end of said support arm, said unit including a source of motive power and a drive-wheel connected thereto and engageable with the surface of said body to drive said unit about said shaft in a path determined by said feed-screw and said worm.

5. Apparatus for heat-testing the concave surface of an upturned, cup-shaped body comprising a base, a rotatable vertical shaft journalled at its lower end in said base, a bar pivotally suspended to rotate on a horizontal axis from the upper end of said shaft, means cooperatively engaging said bar and said shaft for varying the angle therebetween, a support arm pivotally mounted to rotate on a horizontal axis at the lower end of said bar, means for rotating said support arm on its pivot, and a heater unit attached to the end of said support arm, said heater unit comprising a frame attached to the end of said support arm, a plurality of gas distributing chambers pivotally attached end-to-end, one of said chambers being attached to said frame, a plurality of gas jets projecting downwardly from each of said chambers, said jets being arranged in a row substantially parallel to the plane formed by said shaft and said bar, means on each of said chambers for maintaining a predetermined minimum space between the chamber and the surface of said body, gas supply means for each of said chambers, and means for driving said heater unit along said surface.

6. Apparatus for heat-testing the concave surface of an upturned, cup-shaped body comprising a base, a rotatable vertical shaft journalled at its lower end in said base, a bar pivotally suspended to rotate on a horizontal axis from the upper end of said shaft, a feed-screw cooperatively engaging said bar and said shaft to vary the angle therebetween, a telescopic support arm pivotally mounted to rotate on a horizontal axis at the lower end of said bar, a helical spring within said support arm constantly urging said arm to its extended position, a worm-and-wheel cooperatively connecting said bar and said support arm to rotate the latter on its pivot, and a heater unit pivotally attached to the extensible end of said support arm, said heater unit comprising a frame, a plurality of gas distributing chambers pivotally attached end-to-end, each of said chambers having a plurality of downwardly projecting gas jets, one of said gas distributing chambers being pivotally attached at the forward end of said frame to rotate on perpendicularly transverse axes, said jets being arranged in a row substantially parallel to the plane formed by said shaft and said bar, means on each of said gas distributing chambers for maintaining a predetermined minimum space between the chamber and the surface of said body, gas supply means for said chambers, and means for driving said heater along said surface.

LOUIS C. McNUTT.